Feb. 19, 1924.

J. C. NICHOLS ET AL 1,483,984

SHOCK ABSORBER

Filed June 26, 1922

Inventors
James C. Nichols
Elmer Ryder
by Cicero Swan Atty

Patented Feb. 19, 1924.

1,483,984

UNITED STATES PATENT OFFICE.

JAMES C. NICHOLS AND ELMER RYDER, OF CHICAGO, ILLINOIS.

SHOCK ABSORBER.

Application filed June 26, 1922. Serial No. 570,826.

*To all whom it may concern:*

Be it known that we, JAMES C. NICHOLS and ELMER RYDER, both citizens of the United States, residing at Chicago, in the county of Cook and State of Illinois, have invented new and useful Improvements in Shock Absorbers, of which the following is a specification.

This invention relates to shock absorbers for automobiles and other motor vehicles.

The invention has reference to the type of shock absorber disclosed in our prior Patent No. 1,334,390, granted March 23, 1920, and is an improvement thereon.

One object of our present invention is to provide a shoe or other means at the end of the strap engaging the friction band on the stationary drum to enlarge the extent of contact of such parts so that the purchase of the strap on the band will be increased and thus enhance the amount of friction produced between the parts on becoming engaged.

A further object of our invention is to gain, by reason of said shoe or equivalent means, an increased leverage between the parts when engaged, and thus enable a device of one size to be used on cars of various weights.

The invention consists further in the matters hereinafter described and more particularly set forth in the appended claims.

In the accompanying drawings—

Figure 1:
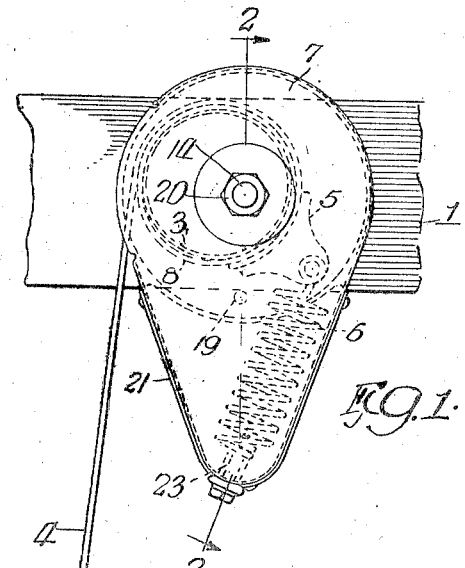
Fig. 1 is a front view of a shock absorber embodying the features of our invention and shown applied to the spring supported frame and axle of an automobile or other motor vehicle.

In the drawings, 1 indicates one of the side members of a vehicle frame and 2 an axle below the same. The member 1 is supported above the axle 2 by a vehicle spring (not shown) as usual in automobile construction.

The shock absorber constructed in accordance with our invention comprises a non-rotatable drum 3 secured to the frame 1; a strap 4 partially looped about the drum and clamped at its outer end to the axle 2; a shoe 5 connected with the other end of the strap; a coiled spring 6 connected at its upper end with said shoe and at its lower end with a member 7 secured to the frame 1 at said drum and extending outward therefrom; and a friction band 8 surrounding the drum between the same and the strap 4.

Figure 6:
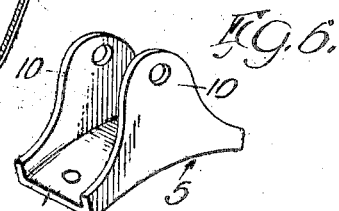
Fig. 6 is a perspective view of the shoe.

As shown in Fig. 6, the shoe 5 has a concave part 9 and ears 10, 10. These are spaced apart and extend outward from the part 9. The upper end of the spring 6 extends between these ears and is engaged with a pivot pin 11 extending between them. The strap 4 covers the concaved part 9 and is secured thereto by rivets 12.

The pivotal connection between the shoe 5 and the spring 6 is about mid-way between the ends of the concaved part 9 so that a portion of the strap 4 is on opposite sides of that connection. This enlarges the extent of contact between the strap 4 and the friction band 8 when the two are engaged, thus increasing the purchase of the strap 4 on the drum 3, with the result that the power of the device to absorb shocks is enhanced.

Figure 3:
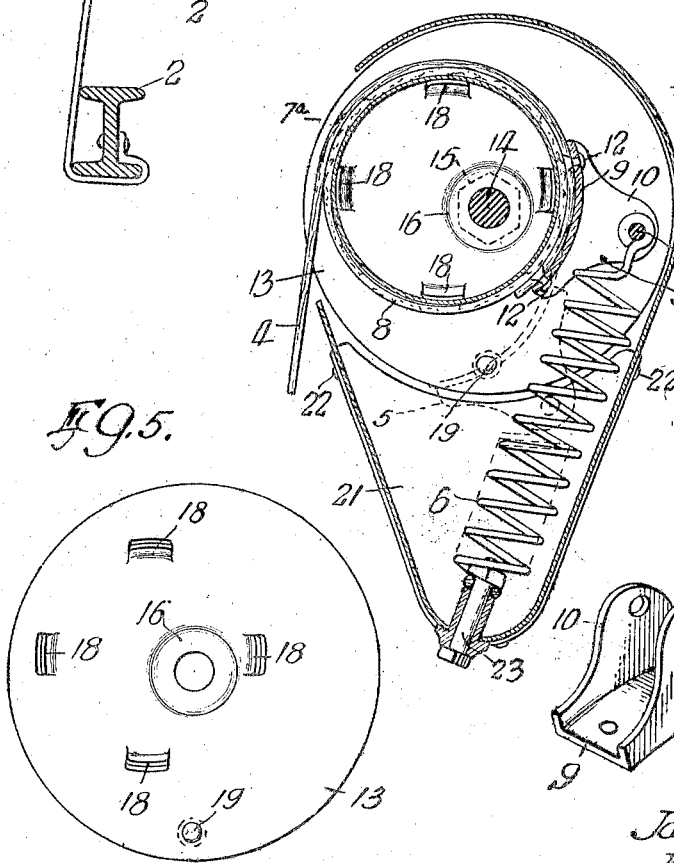
Fig. 3 is an enlarged vertical sectional view taken on line 3—3 of Fig. 2, the shoe being shown in two positions.
Figure 4:
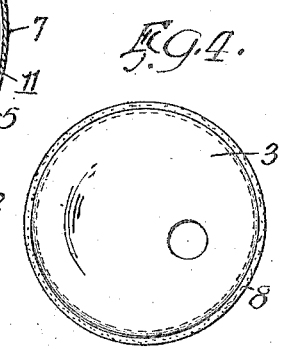
Fig. 4 is a view of the non-rotatable drum and friction band thereon.
Figure 5:
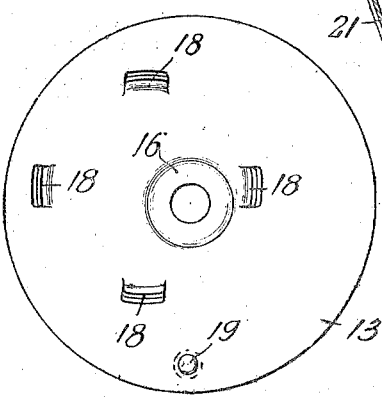
Fig. 5 is a view of the drum supporting plate.

Under normal conditions, the shoe 5 occupies the position shown in dotted lines in Fig. 3, and at that time is out of contact with the friction band 8. When a shock is received, the parts 1 and 2 of the vehicle separate on the rebound, and the spring 6 being expanded draws the shoe 5 immediately into contact with the friction band 8. By having the shoe, the extent of contact of the strap 4 with the band 8 is increased, thereby increasing the friction exerted on the drum and making greater the power of the device to resist the shock and absorb it as the shoe travels up on the drum.

By having the ears 10, 10, the spring 6 is connected with the shoe 5 at a point spaced outward from the strap 4. This increases the leverage exerted by the spring 6 on the shoe 5 when the latter engages the drum because the distance between the center of the drum and the pivot pin 11 is greater than when the spring is connected directly to the strap as in our prior patent. Thus the device, by reason of the increased leverage, is enabled to take care of cars of various weights without an opportunity afforded for unduly expanding the spring 6 and weakening it. The construction described therefore allows the use of a spring 6 having a tension relatively slight as compared to the weights of the cars for which the device is designed.

Figure 2:
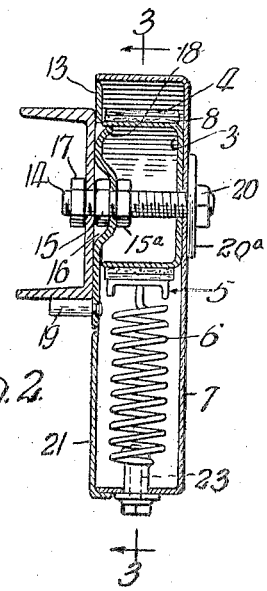
Fig. 2 is a vertical sectional view taken on line 2—2 of Fig. 1.

As to details of construction, the device is made as follows. There is a stamped steel base plate 13, which fits against the outside of the side member 1, as shown in Fig. 2. The plate 13 is secured to the frame member 1 by a bolt 14 having a fixed nut 15 between its ends and engaging the rear of the plate 13 in a socket 16 therein. This allows the plate 13 to be brought into tight contact with the member 1. The portion of the bolt 14 at the rear side of the plate 13 extends through the frame member 1 and receives clamp nut 17, as shown.

The bolt 14 also extends from the front side of said plate 13 and through the drum 3. To hold the drum from displacement on said plate, the latter has outwardly projecting prongs or tongues 18. The drum 3 slips over these and is engaged by them, as shown. To hold the plate 13 against turning about the bolt 14, the plate has a lug 19 extending inward under the frame 1, and a nut 15ª on the bolt inside the drum 3 engages against the plate 13 and aids in holding it in place.

The member 7 is in the form of a housing to enclose the drum and spring 6. This fits over the plate 13 and is secured in place on the bolt 14 by a clamp nut 20 with a washer 20ª between, as shown. The rear side of this housing 7 is open to receive the plate 13 and also to permit inspection of the spring 6, shoe 5 and other parts enclosed by the same. To close the portion of the housing 7 below the plate 13, there is a cover 21. This is detachably secured in place by screws 22 to allow for removal. The lower end of the spring 6 is secured to the casing 7 by a bolt 23, as shown.

By loosening the nut 20, the member 7 may be adjusted about the bolt 14 to vary the extent of the loopage of the strap 4 about the drum 3 to take care of different weights of cars for which the device is designed and also to compensate for wear between the parts. This adjustment is permitted by making the plate 13 circular and the adjacent edges of the housing 7 and cover 21 arcs of concentric circles, as clearly shown in Fig. 3. When clamped in place, the housing 7 is a fixed member carried by the frame 1 for the spring 6. The strap 4 extends outward from the housing 7 through a slot or opening 7ª provided at one side thereof.

While we have shown and described herein in detail a shock absorber of our invention, it is of course to be understood that the details of construction and arrangement of parts may be variously changed and modified without departing from the spirit and scope of our invention.

We claim as our invention:

1. The combination with a spring supported vehicle frame and axle, of a shock absorber, comprising a non-rotatable drum and a fixed member both carried by said frame, a strap partially looped about said drum and having frictional engagement therewith, one end of said strap being secured to said axle, a spring having one end connected with said fixed member, and means connecting together the free ends of said strap and spring, said means moving with said strap toward and from the drum and increasing the purchase of the strap on said drum when moved toward the same by causing the strap to engage the drum on opposite sides of its connection with said spring.

2. The combination with a spring supported vehicle frame and axle, of a shock absorber, comprising a non-rotatable drum and a fixed member both carried by said frame, a strap partially looped about said drum and having frictional engagement therewith, one end of said strap being secured to said axle, a spring having one end secured to said fixed member, and means carried by the strap at its free end and connecting together the free ends of said strap and spring, said spring extending outward from said drum and having its free end connected with said means at a point spaced outward from the strap to increase the leverage of the spring thereon.

3. The combination with a spring supported vehicle frame and axle, of a shock absorber, comprising a non-rotatable drum and a fixed member both carried by said frame, a strap partially looped about said drum and having frictional engagement therewith, one end of said strap being secured to said axle, a shoe secured to the other end of said strap to increase the purchase of the same on said drum, and a spring having one end connected with said shoe and the other end with said fixed member.

4. The combination with a spring supported vehicle frame and axle, of a shock absorber, comprising a non-rotatable drum and a fixed member both carried by said frame, a strap partially looped about said drum and having frictional engagement therewith, one end of the strap being secured to said axle, a shoe at the other end of the strap and secured thereto, said shoe having a concave part to fit the drum, and a spring having one end secured to said fixed member and the other end to said shoe at a point spaced outward from said concave part and intermediate the ends thereof.

5. The combination with a spring supported vehicle frame and axle, of a shock absorber, comprising a non-rotatable drum and a fixed member both carried by said axle, a strap partially looped about said drum and having frictional engagement therewith, one end of said strap being secured to said axle, a shoe secured to the other end of the strap and having a concave part to fit said drum, said shoe having outwardly projecting ears, and a spring secured at one end to said fixed member and at the other end to said shoe between said ears.

6. The combination with a spring supported vehicle frame and axle, of a shock absorber, comprising a non-rotatable drum and a fixed member both carried by said frame, a strap partially looped about said drum and having frictional engagement therewith, one end of the strap being secured to said axle, a shoe secured to the other end of said strap, and having a concave part to fit said drum, and a spring connected at one end with said fixed member and at the other end with said shoe, said fixed member being in the form of a housing to enclose the other parts of the device with the strap extending out of the same on one side thereof.

7. The combination with a spring supported vehicle frame and axle, of a shock absorber, comprising a non-rotatable drum and a fixed member both carried by said frame, a strap partially looped about said drum and having frictional engagement therewith, one end of the strap being secured to said axle, a shoe secured to the other end of said strap and having a concave part to fit said drum, and a spring connected at one end with said fixed member and at the other end with said shoe, said fixed member being connected with said frame in a manner permitting the same to be adjusted in an arc of a circle transverse to said axle for varying the loopage of the strap about said drum.

8. A shock absorber, comprising a base plate, a non-rotatable drum secured thereto, a strap partially looped about said drum and having frictional engagement therewith, a housing secured to said plate over said drum and having the strap extended out of the same, said housing having a part extending outward from said drum in the plane thereof, a coiled spring in said housing and having one end secured thereto at a point spaced from said drum, and a shoe in said housing and connecting together the free ends of said strap and spring, said shoe having a concave part to fit said drum.

9. A shock absorber, comprising a base plate, a non-rotatable drum secured thereto by a bolt, said base plate having parts extending into said drum and engaging the same, a strap partially looped about said drum, a housing secured to said plate over said drum by said bolt, said housing having a part extending outward from said drum in the plane thereof, a coiled spring in said housing and having one end secured thereto at a point spaced from said drum, and a shoe in said housing and connecting together the free ends of said strap and spring, said shoe having a concave part to fit said drum, and said strap extending over and being secured to the same.

10. A shock absorber, comprising a circular base-plate, a non-rotatable drum secured thereto, a housing open at its rear to receive said drum and having a curved upper edge to fit against said plate, a strap partially looped about said drum and having frictional engagement therewith, said strap extending out of said drum at one side thereof, a coiled spring in said housing and having one end connected therewith, a shoe in said housing and connecting together the adjacent free ends of said strap and spring, a cover closing the rear of said housing below said plate and having a concave upper edge to enable the housing to be adjusted circumferentially about said plate and drum, and means connecting together said housing and plate in a manner permitting such adjustment.

11. A shock absorber, comprising a circular base-plate, a non-rotatable drum secured thereto by a bolt, said bolt extending through said drum and base-plate, a fixed nut on said bolt at the rear of said plate and in a recess provided therefor in said baseplate, a strap partially looped about said drum and having frictional engagement therewith, a housing secured to said plate over said drum with the strap extending out of the same, a coiled spring in said housing and having one end connected therewith, and a shoe in said housing and connecting together the adjacent free ends of said strap and spring.

In testimony that we claim the foregoing as our invention, we affix our signatures, this 24th day of June, A. D. 1922.

JAMES C. NICHOLS.
ELMER RYDER.